Aug. 31, 1937. P. R. FORMAN 2,091,390
WINDSHIELD WIPER MECHANISM
Filed June 23, 1936   2 Sheets-Sheet 1
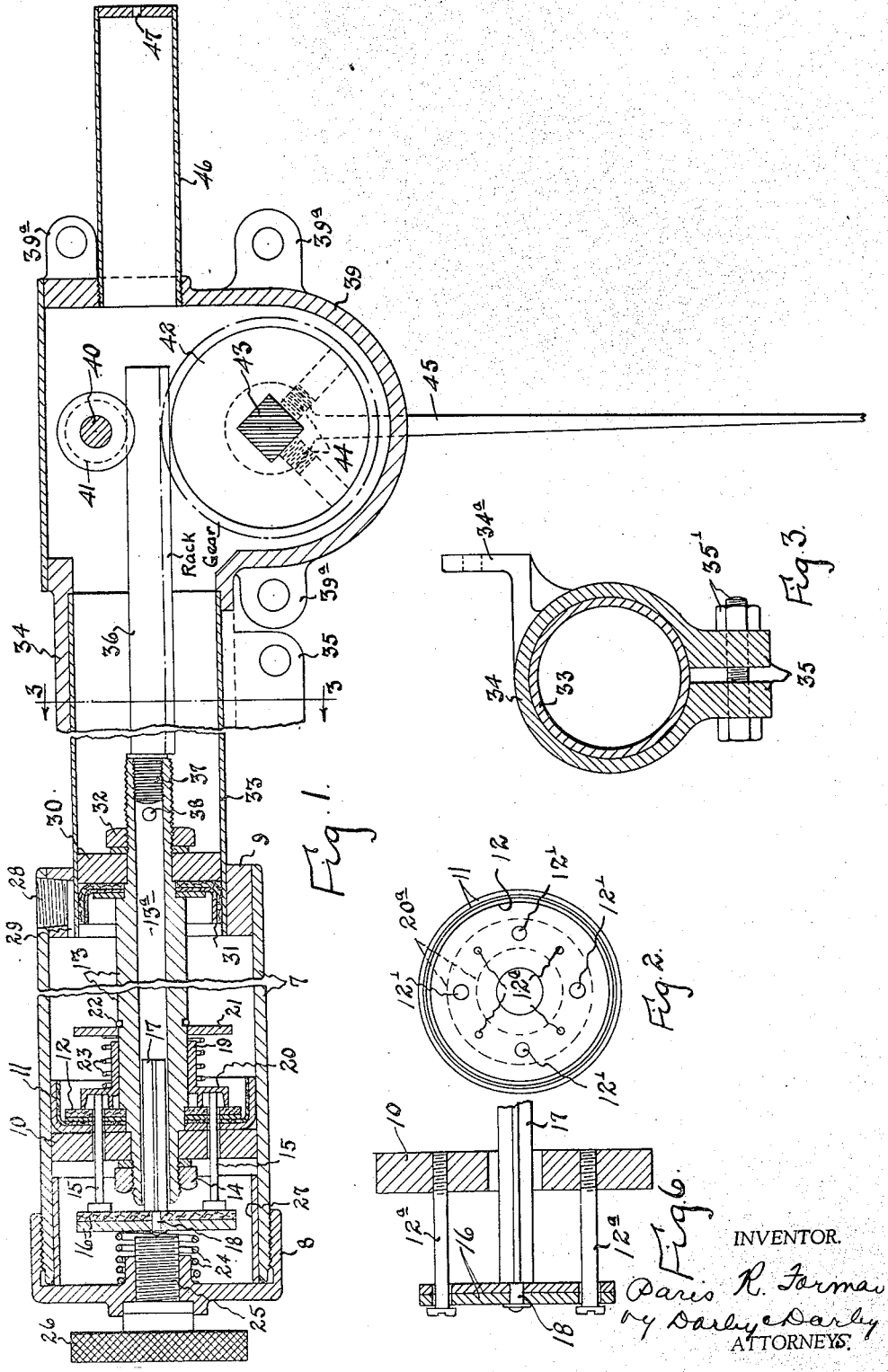
INVENTOR.
Paris R. Forman
by Darby & Darby
ATTORNEYS.

Aug. 31, 1937.  P. R. FORMAN  2,091,390
WINDSHIELD WIPER MECHANISM
Filed June 23, 1936   2 Sheets-Sheet 2
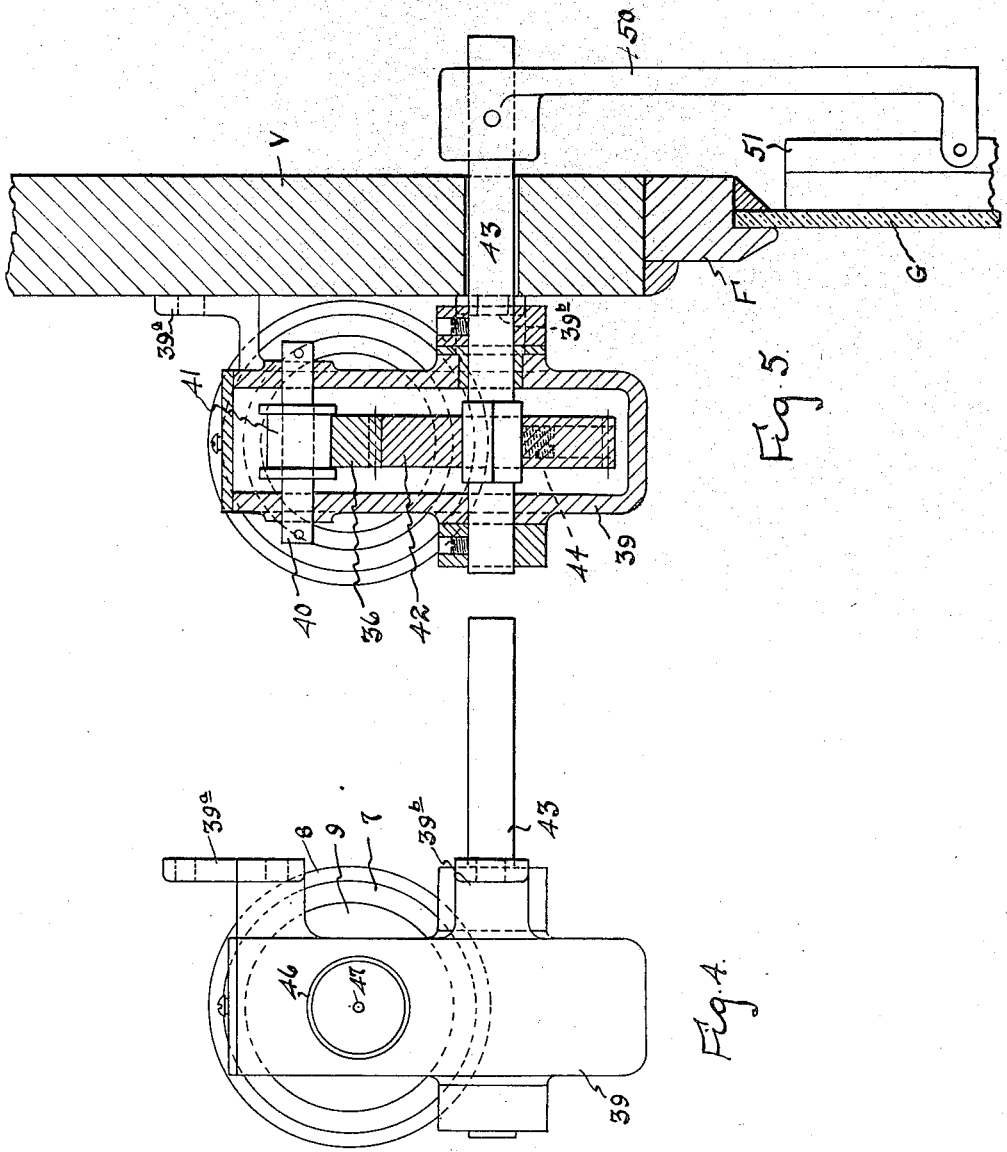
INVENTOR.
Faris R. Forman
BY Darby & Darby
ATTORNEY.

Patented Aug. 31, 1937

2,091,390

UNITED STATES PATENT OFFICE 2,091,390

WINDSHIELD WIPER MECHANISM

Paris R. Forman, Rahway, N. J., assignor to National Pneumatic Company, New York, N. Y., a corporation of West Virginia Application June 23, 1936, Serial No. 86,757

6 Claims. (Cl. 121—123)

This invention is for improvements in power operated windshield wipers of the type particularly suitable for use on busses, street cars, and the like.

The invention is particularly concerned with an improved form of automatically reversing pressure fluid operated engine for oscillating the wiper.

The important object of the invention is to provide wholly within the engine, and mounted directly on the piston, an automatically operated reversing valve to effect reciprocation of the piston and piston rod connected thereto.

The many other objects of this invention will be apparent from the following detailed description and one for the mechanism embodying the principles thereof.

This invention resides substantially in the combination, construction, arrangement and relative location of parts, all as will be set forth in full detail in connection with the attached drawings.

In the accompanying drawings

Figure 1 is a longitudinal, central, cross sectional view through the mechanism of this invention;

Figure 2 is a front elevational view of the reversing valve seat showing in dotted lines the relation of the valve member to the seat;

Figure 3 is a cross sectional view with some parts removed on the line 3—3 of Figure 1;

Figure 4 is an end elevational view of the motor;

Figure 5 is a transverse, vertical, cross sectional view through the motor and a window and its frame to show the relationship therebetween; and Figure 6 is a cross sectional view showing a detail of the piston and valve assembly.

The pressure fluid engine illustrated is of the differential type. The engine itself comprises a large cylinder 7 closed at one end by means of a screw cap 8 and at the other by means of a closure plate 9 which may be welded in the end of the cylinder or otherwise secured thereto. Within the large cylinder is a piston assembly comprising the disc 10 and the cup washers 11 usually of leather. At 12 is a leather disc which forms a valve seat, and which with the parts 10 and 11 is clamped onto the tubular piston rod 13 by means of a nut 14. The piston rod has a bore 13ª extending all the way through it.

The piston assembly, as is clear from Figure 2, has four holes 12' therethrough in which four rods 15 are slidably mounted. These rods are positioned to engage a pair of discs 16 which are secured together face to face on a fluted stem 17 by means of the reduced end 18 which passes through the discs and is riveted thereto, as is clear from Figure 1. The inner one of discs 16 is preferably of some suitable resilient material such as leather so as to form a good seal between it and the associated end of the piston rod 13. The discs 16 are secured to the disc 10 by screws 12ª, which discs 16 are free to slide thereon. The valve member which cooperates with the seating disc 12 comprises a tubular sleeve 19 having an annular integral disc portion 20 with a pair of annular radially spaced webs on the face thereof adjacent the disc 12. The holes 12' are larger than the rods 15 to provide ports which extend through them and are aligned with passages completely through the piston assembly. These ports are positioned so as to fall between the annular webs on the valve 20. At 21 is a disc mounted on the piston rod and held against longitudinal movement away from the piston assembly by means of a snap ring 22. Lying between the disc 21 and the valve 20 is a spring 23 which acts to hold the disc seated against the plate 12.

Mounted in the screw cap 8 is an adjusting screw 25 which is provided with a knurled finger knob 26. The screw is provided with a shoulder as shown so that it may only be adjusted inwardly a fixed distance. Lying between the screw cap and the discs 16 is a spring 24 which is supported on the screw cap in any suitable manner so that it will remain in position when the discs 16 move away from it. This spring is of such length that it projects beyond the end of the adjusting screw 25 so as to engage the discs 16 as they approach the end of the screw.

It will be seen that the discs 16 and the disc 20 provide a pair of valves cooperating with the end of the piston rod 13 and the disc 12 so that they seat alternately as will be more apparent from a description of the operation of the device. Fitted within the end of the cylinder adjacent the screw cap 8 and secured therein in any suitable manner is a stop ring 27 positioned to limit the movement of the piston assembly to the left, Figure 1. At 28 is a threaded port communicating with a passage 29 that opens into the large cylinder 7. To this port is to be connected a pipe from any suitable source of pressure fluid such as an air reservoir.

Mounted in and secured in an opening in the closure plate 9 is the small cylinder 33 in which a piston assembly comprising the disc 30 and the leather cups 31 operate. The piston assembly is clamped upon the end of the piston rod 13 by means of the lock nut 32. The other end of the cylinder 33 fits into the split tubular portion 34 of a gear housing 39. The tubular portion 34 is provided with the depending flanges 35 which may be drawn together by means of the nuts and bolts 35' (see Figure 3) to clamp the gear housing on the end of the small cylinder.

Fitted in the end of the piston rod 13 by means of the reduced threaded portion 37 is a gear rack 36. A threaded stop 37 seals the end of the hollow piston 33 which is provided with a series of apertures 38 adjacent thereto. The inner rack 36 meshes with a gear 42 mounted upon a square section of the shaft 43 which is journaled in the gear housing 39, as is clear from Figures 4 and 5. This gear is locked on the square section by the screws 44. Threaded on a shaft 40 in the gear housing is a grooved roller 41 positioned to engage the top of the rack 36 to hold it in mesh with the gear 42.

Fitted in the gear housing in a position to be in alignment with the path of travel of the rack 36 is a tubular extension 46 closed by a disc at the end having an aperture 47 therethrough.

As is clear from the various figures the motor and gear housing are provided with supporting brackets. Thus the sleeve 34 is provided with a supporting bracket 34ª and the gear housing is provided with brackets or feet 39ª and 39ᵇ. By means of these feet the motor and gear mechanism may be mounted on the arm V over the window opening. The window frame is illustrated at F and its glass at G. When thus mounted the shaft 43 projects through an opening in the support V and has secured on its projecting end a wiper arm 45 on which is pivotally mounted any suitable form of wiper 51 in such a manner that the wiper may move over the outer face of the glass.

In the operation of this device the port 28 is connected by a suitable pipe to the air pressure source. Air is then supplied between the two piston assemblies. Air will therefore enter the space between the two pistons causing them to move to the left as a unit because of their interconnection by the piston rod. This movement to the left, Figure 1, will occur because of the difference in areas of the two pistons exposed to the same pressure. The right hand face of piston 31 is of course open to the atmosphere since the gear casing is open through the port 47. The movement of the assembly to the left will continue until discs 16 engage the spring 24. The pressure exerted by this spring is not sufficient however to cause the valves to shift. Further movement of the assembly will cause the discs 16 to engage the fixed screw 25. When this occurs the movement of these discs ceases.

It may be noted that the spring 24 aids somewhat in cushioning the engagement of the discs with the screw and causes valve 16 to snap over. At the time the discs stop their movement the piston assembly continues its movement to the left, Figure 1, with the result that spring 24 is compressed and rods 15 cause valve disc 20 to unseat against the resistance of spring 23. As soon as valve disc 20 moves off its seat, the pressure on both sides approaches balance so that compressed spring 24 snaps valve disc 16 onto its seat. The piston assembly continues to move until the end of the piston rod engages the inner of the discs 16. The unseating of disc 20 permits air to escape through the large piston to the left hand end of cylinder 7. The pressure in the left hand end of cylinder 7 quickly builds up so that the pressure on both faces of the large piston is balanced with the result that the assembly begins to move to the right because of the pressure on the small piston. The valves comprising the discs 16 and 20 remain in shifted position because sufficient of the area of the discs 16 is blanked off at the end of the piston rod so that the pressure tending to hold the discs seated is greater than the pressure tending to unseat them, including the pressure exerted by spring 23. Thus the inner disc 16 remains seated against the end of the piston rod, and disc 20 remains unseated so that the communication between both ends of the cylinder through the ports 12' remains established.

The piston assembly therefore continues to move to the right, Figure 1, until disc 21 strikes the face of the closure plate 9. Continued movement of the piston assembly causes compression of spring 23 to a point where it seats disc 20 and unseats disc 16. It is noted that disc 21 may slide on the piston rod until it engages the sleeve 19 to insure the seating of valve 20. The seating of disc 20 cuts off the supply of air to the left hand end of cylinder 16 and the unseating of disc 16 opens the left hand end to the atmosphere through the passage 13ª and port 38 into the gear housing open to the atmosphere. Thus the piston assembly immediately reverses its direction of movement and again moves to the left. This reciprocation of the piston assembly continues until the screw 25 is backed off a sufficient distance so that its end may not be engaged by the discs 16. When this occurs on the next movement of the piston assembly to the left the engine comes to a stop when the large piston engages the shoulder formed by the ring 27. The resistance offered by spring 24 is not sufficient to overcome the pressure on the disc 20 and the resistance offered by spring 23 at the time the large piston engages the ring 27. Thus the engine always comes to a stop in this position and will remain in this position with the full air supply on it until screw 25 is adjusted back to operative position. When this is done at the time that the large piston engages the ring 27 it forces disc 26 to move against the end of the piston rod sealing it and unseating disc 20. It is noted that the screw is so constructed that it may only be adjusted inwardly the same distance each time when the hub on it seats against a washer on the screw cap. Of course the reciprocation of the piston causes reciprocation of the rack and thereby produces oscillation of the gear 42, shaft 43 and the wiper arm 45. This sweeps the wiper across the glass to keep it clean.

From the above description it will be apparent that this invention resides in certain principles of construction and operation which may be embodied in other physical forms without departure from the true scope thereof. I do not therefore desire to be strictly limited to the disclosure as given for purposes of illustration, but rather to the scope of the appended claims.

What I seek to secure by United States Letters Patent is:

1. A pressure fluid engine of the type described comprising a large and small cylinder united in longitudinal alignment, a large and small piston mounted in said cylinders respectively, a hollow piston rod uniting said pistons into a unit, means for continuously supplying pressure fluid to the cylinders between said piston, said large piston having passages therethrough, a valve mounted on said piston for opening and closing said passages, another valve mounted on said piston rod for closing one end thereof, and means for engaging each of said valves for alternately seating them at the end of the stroke of the piston unit in either direction to effect automatic reversal of the piston unit, the means for engaging one of said valves being movable out of engaging position whereby the piston unit remains stationary.

2. A pressure fluid engine of the type described comprising a large and small cylinder united in longitudinal alignment, a large and small piston mounted in said cylinders respectively, a hollow piston rod uniting said pistons into a unit, means for continuously supplying pressure fluid to the cylinders between said piston, said large piston having passages therethrough, a valve mounted on said piston for opening and closing said passages, another valve mounted on said piston rod for closing one end thereof, means for alternately seating said valves at the end of the stroke of the piston unit in either direction to effect automatic reversal of the piston unit, and positionable means for engaging one of the valves at the end of the stroke of the piston unit in one direction to render the device operative or inoperative.

3. A pressure fluid engine of the type described comprising a pair of aligned and connected cylinders of different diameters, pistons of different diameters mounted respectively in the cylinders, a hollow piston rod uniting said pistons into a unit, the end of the piston rod adjacent the smaller piston being always open to the atmosphere, the larger piston having passages therethrough, a spring loaded valve for sealing the passages in the piston, a second valve mounted on the larger piston for sealing the passage in the piston rod, a connection for continuously supplying pressure fluid to the cylinders between the pistons, a stop member engageable by the second valve for seating it to close the passage in the piston rod at the end of the stroke of the pistons in one direction, and means actuated by the second valve as it seats for unseating the first valve, said first mentioned valve being seated when the pistons reach the end of their stroke in one direction.

4. A pressure fluid engine of the type described comprising a pair of aligned and connected cylinders of different diameters, pistons of different diameters mounted respectively in the cylinders, a hollow piston rod uniting said pistons into a unit, the end of the piston rod adjacent the smaller piston being always open to the atmosphere, the larger piston having passages therethrough, a spring loaded valve for sealing the passages in the piston, a second valve mounted on the larger piston for sealing the passage in the piston rod, a connection for continuously supplying pressure fluid to the cylinders between the pistons, a stop member engageable by the second valve for seating it to close the passage in the piston rod at the end of the stroke of the pistons in one direction, and means actuated by the second valve as it seats for unseating the first valve, said first mentioned valve being seated when the pistons reach the end of their stroke in one direction, said stop member being movable to a position where said second valve cannot engage it whereby the piston assembly comes to rest.

5. A pressure fluid engine of the type described comprising a pair of longitudinally aligned and connected cylinders of different diameters, pistons in said cylinders, a hollow piston rod uniting the pistons into a movable unit, means for continuously supplying air to the cylinders between said pistons, passages through the larger piston, valve means mounted on the larger piston for alternately closing the passages in the piston rod and the piston at the end of the stroke of the piston unit in either direction, and a positionable stop member for engaging the valve means at the end of the stroke of the piston unit in one direction, said stop member being positionable so as not to engage the valve means whereby the piston assembly comes to rest.

6. A pressure fluid engine of the type described comprising a pair of longitudinally aligned and connected cylinders of different diameters, pistons in said cylinders, a hollow piston rod uniting the pistons into a movable unit, means for continuously supplying air to the cylinders between said pistons, passages through the larger piston, valve means mounted on the larger piston for alternately closing the passages in the piston rod and the piston at the end of the stroke of the piston unit in either direction, a positionable stop member for engaging the valve means at the end of the stroke of the piston unit in one direction, said stop member being positionable so as not to engage the valve means whereby the piston assembly comes to rest, and a spring positioned to engage the valve means and be compressed before the valve means engages the stop member whereby upon engagement with the stop member the valve means is quickly operated.

PARIS R. FORMAN.